(12) United States Patent
Mackay

(10) Patent No.: US 6,192,668 B1
(45) Date of Patent: Feb. 27, 2001

(54) METHOD AND APPARATUS FOR COMPRESSING GASEOUS FUEL IN A TURBINE ENGINE

(75) Inventor: Robin Mackay, Rancho Palos Verdes, CA (US)

(73) Assignee: Capstone Turbine Corporation, Woodland Hills, CA (US)

( * ) Notice: Subject to any disclaimer, the term of this patent is extended or adjusted under 35 U.S.C. 154(b) by 0 days.

(21) Appl. No.: 09/420,494

(22) Filed: Oct. 19, 1999

(51) Int. Cl.$^7$ ....................................................... F02C 7/22
(52) U.S. Cl. ........................ 60/39.06; 60/39.465; 60/726
(58) Field of Search ............................... 60/39.06, 39.281, 60/39.465, 726, 728, 734

(56) References Cited

U.S. PATENT DOCUMENTS

| | | |
|---|---|---|
| 2,285,976 | 6/1942 | Huitson . |
| 2,396,083 | 3/1946 | Chase . |
| 2,772,636 | 12/1956 | Yates . |
| 3,161,020 | 12/1964 | LaHaye . |
| 3,313,103 | * 4/1967 | Johnson ................................ 60/39.06 |
| 3,560,105 | 2/1971 | Clifford . |
| 3,623,317 | 11/1971 | Foster-Pegg . |
| 3,740,948 | * 6/1973 | Kellett ..................................... 60/726 |
| 4,062,184 | 12/1977 | Hagen . |
| 4,724,670 | 2/1988 | Greer . |
| 4,754,607 | 7/1988 | Mackay . |
| 4,781,527 | 11/1988 | Miller . |
| 4,785,624 | 11/1988 | Smith et al. . |
| 5,490,376 | * 2/1996 | Van Der Burgt ................. 60/39.465 |
| 6,003,297 | * 12/1999 | Ziegner .................................... 60/726 |

FOREIGN PATENT DOCUMENTS 59-122729    7/1984   (JP) .

* cited by examiner

Primary Examiner—Louis J. Casaregola
(74) Attorney, Agent, or Firm—Brooks & Kushman P.C.

(57) ABSTRACT

A gas turbine engine includes a rotatable impeller having a plurality of vanes with inlet and outlet ends. A plurality of diffuser channels are spaced apart radially beyond the outlet ends. A movable source of gaseous fuel is positioned adjacent the inlet ends of the vanes. The movable source of gaseous fuel is movable as a function of the rotational speed of the impeller, whereby the flow of gaseous fuel injected from the movable source is ejected from the outlet ends of the vanes into a selected one of the plurality of diffuser channels to facilitate combustion.

8 Claims, 2 Drawing Sheets

METHOD AND APPARATUS FOR COMPRESSING GASEOUS FUEL IN A TURBINE ENGINE

TECHNICAL FIELD

The present invention relates to a method and apparatus for compressing gaseous fuel in the rotatable impeller of a gas turbine engine.

BACKGROUND ART

A typical gas turbine engine includes a power section, a gear box, and various accessories such as a starter, fuel control, etc. The power section includes a compressor, a turbine, and a combustor. The compressor and turbine sections of the engine can rotate at speeds as high as 100,000 rpms. Air is compressed in the compressor to several atmospheres, for example, before it goes to the combustor. The combustor is split into two zones. At full load, the primary combustion chamber operates at fairly close to stoichiometric, the ideal fuel/air ratio. All of the fuel, and approximately ¼ of the air or less, start to burn in this zone. The remainder of the air enters the secondary combustion zone through holes in the burner liner. This air provides a relatively cool blanket between the burning gases and the liner before it mixes. This serves to keep the liner cool. It also dilutes the temperature of the hot gases down to the point where the turbine nozzles and wheels will have a long life.

Accordingly, in the combustor, the fuel is burned, which heats the air, which then expands through the turbine wheels. The turbine wheels drive the compressors and, through the reduction gear box, the generator.

It is sometimes desirable to use natural gas rather than diesel fuel in a gas turbine engine because natural gas is generally less expensive, requires no storage tank, burns cleaner, produces significantly less $NO_x$ and provides higher efficiency and more power than diesel fuel.

A major problem with the use of natural gas is that it must be compressed enough to enter the combustor, and known gas compressors are very expensive and require significant energy to run. Most of the compressors available are screw-type or reciprocating compressors. They are generally equipped with gas coolers, oil separators, and accumulators.

Due to the high cost of add-on gas compressors, it is desirable to provide a method and apparatus for compressing the gas in a manner which eliminates the add-on gas compressor, while maintaining the required concentration of natural gas in the mixture which is injected into the primary zone of the combustor.

DISCLOSURE OF INVENTION

The present invention overcomes the above-referenced shortcomings of prior art gas compressors by providing a gas compressor which is integral with the gas turbine engine. The gaseous fuel is injected into the rotatable impeller (i.e., the compressor) of the engine, and is ejected from the impeller into a selected one of a plurality of diffuser channels positioned peripherally about the impeller. The gas is then directed from the selected diffuser channel(s) to the primary zone of the combustor. The source of gaseous fuel is movable in order to adjust the position at which the gaseous fuel is injected into the impeller so that the fuel is always directed into the selected diffuser channel(s).

More specifically, the present invention provides a gas turbine engine including a rotatable impeller having a plurality of vanes with inlet and outlet ends.

A plurality of diffuser channels are spaced apart radially beyond the outlet ends. A movable source of gaseous fuel is positioned adjacent the inlet ends of the vanes for injecting gas into the impeller at a position from which the impeller ejects an air/gas mixture from the outlet ends into a selected one of a plurality of diffuser channels.

The movable source of gaseous fuel is movable as a function of the rotational speed of the impeller, whereby the flow of gaseous fuel injected from the movable source is always directed into the selected diffuser channel to facilitate combustion. The fuel from the selected diffuser channel is directed to the primary zone of the combustor so that the appropriate concentration of fuel is maintained for burning in the combustor.

This invention is useful for a variety of gaseous fuels, including natural gas, vaporized propane, vaporized butane, etc.

A further aspect of the invention provides a method of compressing gaseous fuel in a gas turbine engine comprising: a) rotating an impeller about an impeller axis of the gas turbine engine, wherein the impeller includes inlet and outlet portions at opposing ends of a plurality of vanes; b) injecting gaseous fuel from a movable source of gaseous fuel into the inlet portions such that the fuel travels along the vanes and through the respective outlet portions to a selected one of a plurality of diffuser channels spaced apart radially beyond the outlet portions; and c) adjusting the position of the movable source with respect to the impeller axis based upon the rotational speed of the impeller to ensure that the injected gaseous fuel enters the selected one of the diffuser channels as the rotational speed of the impeller is varied. The gaseous fuel is then directed from the selected diffuser channel to the primary zone of the combustor for burning.

The adjustment of the movable source may be accomplished by capturing pressurized air exhausted from the impeller and using the compressed air to move a piston connected to the movable source, or electrically by a servomotor.

Accordingly, an object of the present invention is to provide a method and apparatus for compressing gaseous fuel for use in a gas turbine engine in a manner in which the add-on gas compressor is eliminated.

The above object and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
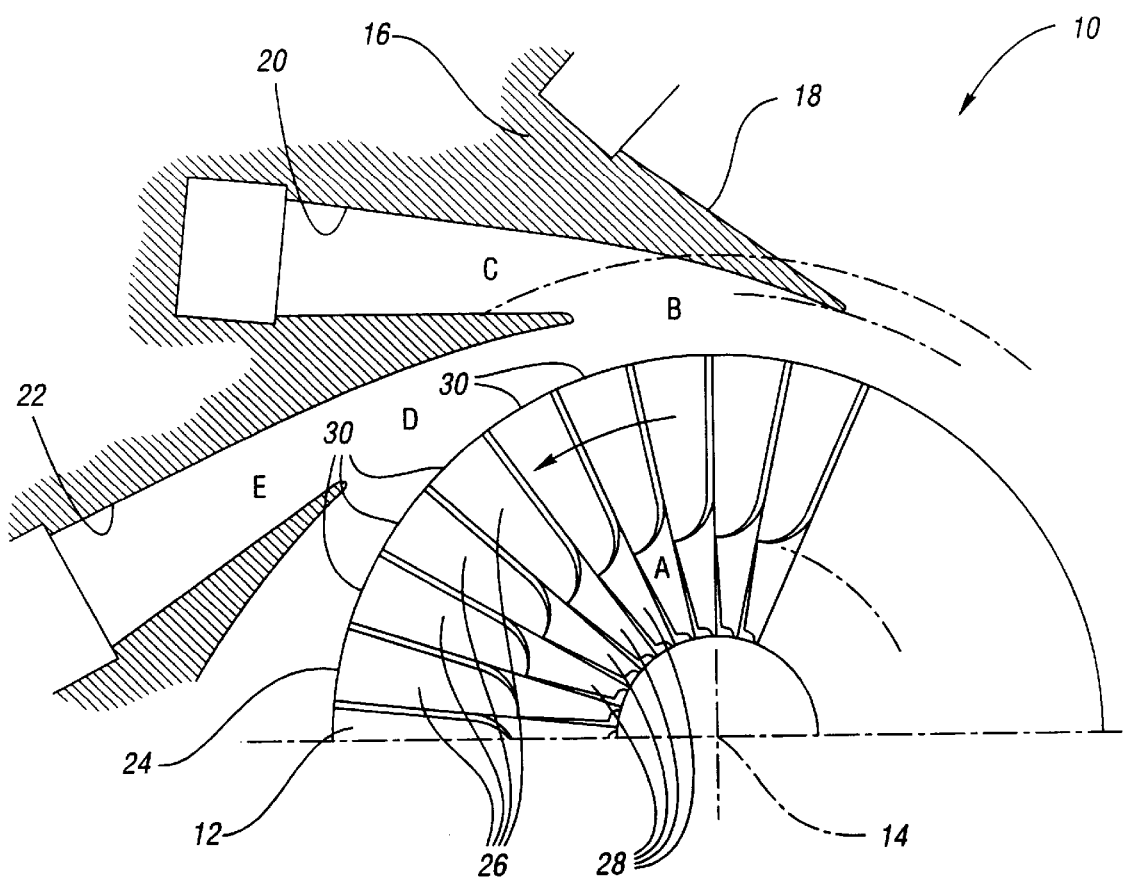
FIG. 1 shows a partial vertical cross-sectional view of a compressor for use with the present invention.
Figure 2:
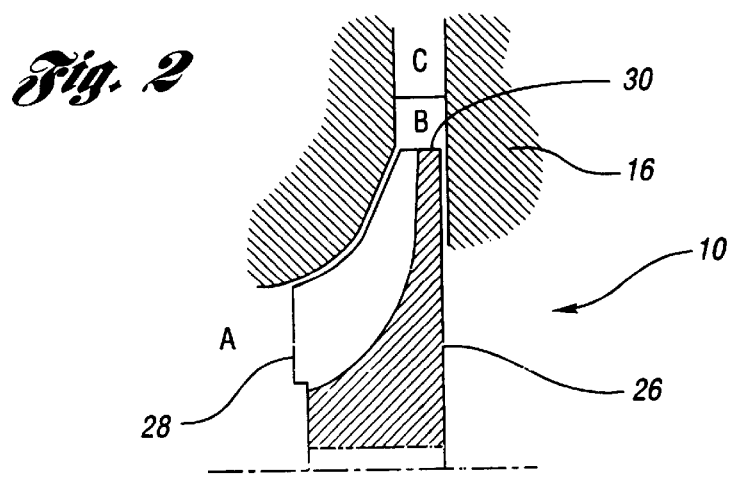
FIG. 2 shows a cross-sectional view of the compressor of FIG. 1 rotated 90°.

Referring to FIGS. 1 and 2, a compressor 10 is shown for use with the present invention. The compressor 10 includes an impeller 12 which is rotatable about an impeller axis 14, and a compressor body 16 which forms a plurality of diffuser channels 18, 20, 22 spaced apart radially beyond the periphery 24 of the impeller 12.

The impeller 12 includes a plurality of impeller vanes 26, each of which includes inlet and outlet ends 28,30, respectively.

If the impeller 12 were not turning but still had air flowing through it, the air entering at point A would discharge at point B and enter diffuser channel C. However, the impeller 12 would be rotating in operation, and as it turns slowly the exit compressor discharge will be at point D and the air will enter diffuser channel E (reference number 22). As it turns faster, the diffuser channel through which the air enters will move further around. At any given speed and temperature, all of the air entering the compressor at point A will go into one or two specific diffuser channels. If a diffuser channel is in the correct position, the air should enter just that one diffuser channel.

The subject of this invention is to direct gaseous fuel into the inlet end 28 of the impeller and to direct the resulting air/fuel mixture, once it has been compressed by the impeller 12, into the selected diffuser channel 18, 20, 22 so that the compressed air/fuel mixture may be properly directed to the primary zone of the combustor for burning.

If a pipe is added at point A which discharges natural gas, this gas would be entrained into the air and compressed along with the air and discharged into a specific diffuser channel 18, 20, 22. If the diffuser has thirteen channels, $\frac{1}{13}$th of the air would be in that channel, less the amount of air displaced by the natural gas. If the overall air/fuel ratio is roughly 135:1, the air/fuel ratio in the selected diffuser channel would be approximately 10:1. Thus, for a lean premix combustor, more air will have to be added to the mixture. This air can be added either before or after the recuperator. This mixture would then be ducted directly to the primary zone of the combustor. The air from the other twelve diffuser passages would go through the recuperator and then be used as dilution air in the secondary zone of the combustor. However, the present invention would work equally well in a simple cycle gas turbine which has no recuperator.

The diffuser channel 18, 20, 22 through which the air/fuel mixture exits will be determined by the velocity and temperature of the mixture and the speed of rotation of the compressor. To some extent, this is self-compensating. The faster the compressor turns, the faster the speed of the fluid going through it. However, this is probably inadequate to ensure that all of the fuel/air mixture goes into the same diffuser channel. One solution is to rotate the diffuser to a new and appropriate position as the speed of the compressor changes. This would pose a challenge for the ducting plus a significant mechanical complication.

A better solution is to mount the natural gas inlet nozzle on a ring that rotates as the speed of the compressor changes. This could be done with a servomotor which determines its position from the frequency of the generator, which is directly related to the speed of the compressor. A less expensive solution is to have a small piston in a cylinder. Compressor discharge air is fed into the cylinder and the piston rotates the ring. As the compressor speeds up, the compressor discharge pressure increases, thus rotating the ring and the position through which the natural gas enters. Then, the fuel/air mixture always exits into the same diffuser channel. A position sensor matched against the generator frequency could provide a check on whether or not the pneumatic actuation system was working. Additionally, ambient temperature and compressor compensation may be needed, depending upon the application.

Because the fuel/air mixture does not pass through the recuperator, it will not experience the pressure drop in the recuperator which the remaining gas experiences. This will permit it to flow more easily into the combustor. This may be crucial as the molecular weight of the fuel/air mixture is less than that of air and the compressor discharge pressure of the fuel/air mixture may be slightly lower than that of the diffuser channels discharging air alone.

A secondary consideration is that if the fuel/air mixture does not go through the recuperator, the efficiency of the gas turbine will be lower as only $\frac{12}{13}$ths of the air will be recuperated. However, there is some compensation as the temperature rise of the air which does go through the recuperator will be higher because of the reduced mass flow. The reduction in efficiency is compensated by the absence of a separate fuel/gas compressor. Also, lower temperature combustion air could also lead to lower $NO_x$ output. Furthermore, the passages through the recuperator are well defined and discrete, therefore it might be possible to route the fuel/air mixture through the recuperator and keep it segregated.

Figure 3:
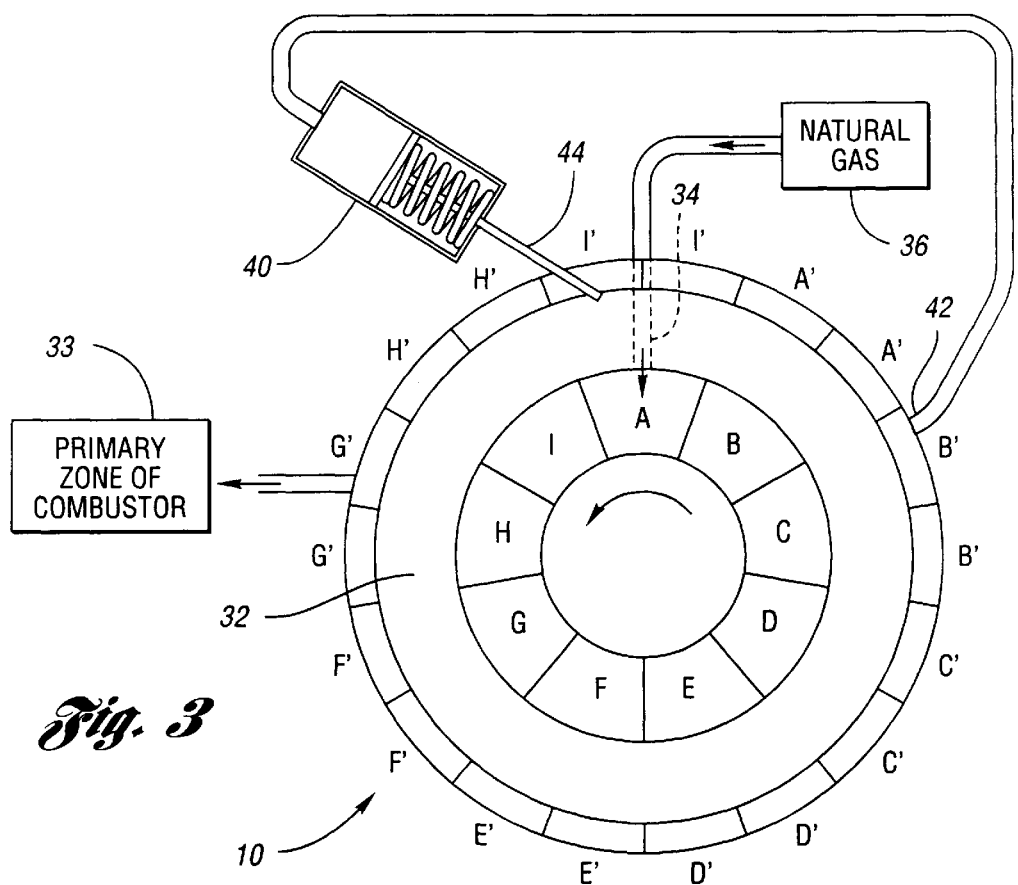
FIG. 3 shows a schematic plan view of a compressor assembly in accordance with the present invention.
Figure 4:
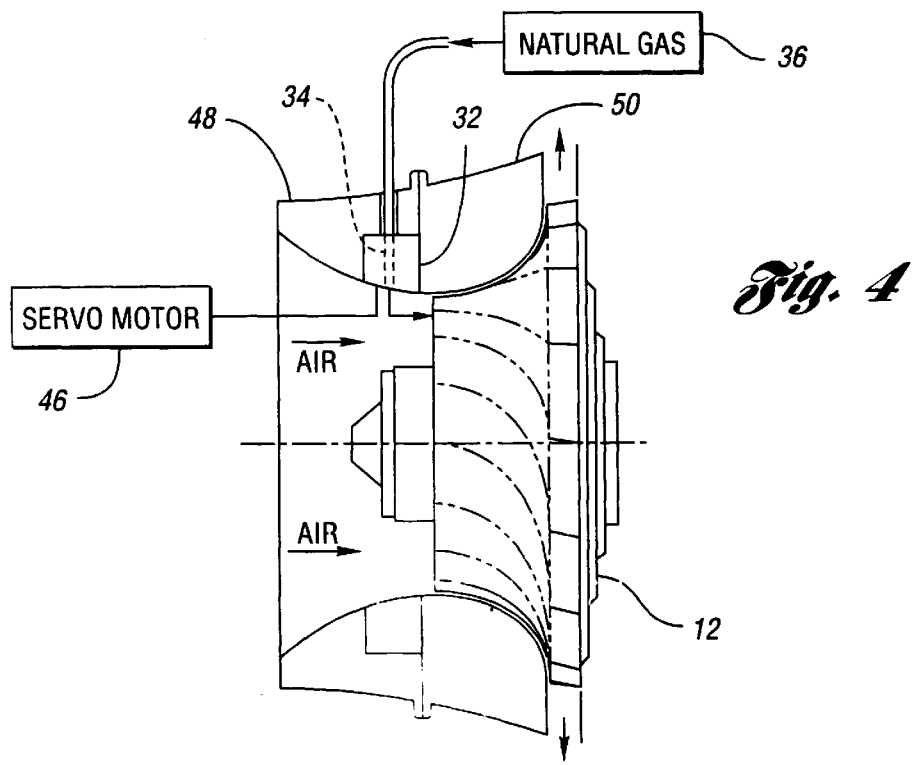
FIG. 4 shows a schematically arranged side view of a compressor assembly in accordance with an alternative embodiment of the invention.

Embodiments of the invention are illustrated schematically in FIGS. 3 and 4. Referring to FIG. 3, the compressor assembly 10 includes a fuel ring 32 with a movable source 34 of natural gas 36 connected to the ring 32. If the compressor 10 was stationary but still had air flowing through it, then air entering through inlet passage A would discharge out through the two passages located at A'. There are two outlet passages because a splitter blade starts partway through the passage. The outlet positions are offset from the inlet because the blades are curved. Correspondingly, air entering through inlet passage B would discharge out through the two passages located at B', and so on.

However, the compressor will be spinning. Therefore, air entering at inlet A will turn with the compressor rotation and might exit at outlet positions I', H', G', or F'.

Assume that the compressor is turning at a speed in which the air entering through inlet passage A when inlet passage A is at the top is discharged at outlet positions G'. If natural gas at very low pressure is injected correctly in front of inlet passage A, it will mix with the air entering at inlet passage A and the resulting mixture should be compressed and discharged at outlet positions G as well. As the compressor turns, inlet passage A moves away from the natural gas nozzle which now discharges into inlet passage B as it is now at the top. However, it still discharges at outlet positions G' as that location is fixed. Thus, a series of inlet passages rotate in front of the fuel nozzle but the fuel/air mixture discharges at outlet positions G'.

With a multi-passage diffuser, the inlet to one diffuser passage is located at outlet positions G'. The fuel/air mixture now goes through a discrete passage in the multi-passage diffuser and is taken to the primary zone of the combustor 33. If necessary, it may then be diluted with air from the other passages.

When the compressor speed changes, the amount of rotation changes and the natural gas/air mixture no longer discharges through the same diffuser passage.

The invention contemplates rotating the fuel nozzle 34 as the compressor speed changes. The bell mouth shroud on the compressor inlet can be sectioned into an outer shroud 48 and an inner shroud 50 (as described below with reference to FIG. 4) with the fuel ring 32 containing the fuel nozzle mounted in between. This ring 32 can then be rotated backward with respect to the compressor rotation as the speed of the compressor increases. Then the natural gas/air mixture will always discharge into the same diffuser passage regardless of compressor speed. Of course, multiple diffuser passages could be selected for discharge if desired.

The fuel ring can be mounted in a variety of ways including anti-friction bearings, etc. It can be actuated using a cylinder 40 which is charged by captured discharge from the compressor at 42, which causes movement of the piston 44. The piston 44 is connected to the rotatable ring 32 and movable therewith, thereby allowing adjustment of the position of the source 34 of natural gas 36. The captured discharge at 42 will have a higher pressure with increased speed of rotation, therefore pressure in the cylinder 40 will increase and the piston 44 will move a greater amount at higher speeds, thus rotating the ring 32 and source 34 as the speed changes.

An alternative embodiment is shown in FIG. 4 wherein the ring 32 is adjusted by a servomotor 46, which is operatively connected to the ring 32, which is positioned between the outer shroud 48 and inner shroud 50. The speed of the impeller 12 is sensed, and the servomotor 46 adjusts the rotational position of the ring 32 and movable source 34 based upon the sensed speed.

The concept would be improved if the impeller did not have splitter blades which reduce the area into which the fuel/air mixture discharges.

This concept offers several advantages. The hardware is much simpler and lower cost than a separate compressor. It is far more efficient than any of the fuel/gas compressors currently known. It can probably even be used with low BTU gases without significant energy consumption. It is much more compact than a separate gas compressor, and the required maintenance should be minimal.

While the best modes for carrying out the invention have been described in detail, those familiar with the art to which this invention relates will recognize various alternative designs and embodiments for practicing the invention within the scope of the appended claims.

What is claimed is:

1. A gas turbine engine comprising:
    a rotatable impeller having a plurality of vanes with inlet and outlet ends;
    a plurality of diffuser channels spaced apart radially beyond said outlet ends;
    a movable source of gaseous fuel positioned adjacent said inlet ends of said vanes for injecting gaseous fuel into the inlet ends so that the fuel will be compressed with air in the impeller and ejected into a selected one of said plurality of diffuser channels;
    wherein said movable source of gaseous fuel is movable as a function of the rotational speed of the impeller, whereby the flow of gaseous fuel injected from said movable source is always directed into said selected one of the plurality of diffuser channels to facilitate combustion.

2. The gas turbine engine of claim 1, wherein said movable source of gaseous fuel comprises a movable source of natural gas.

3. The gas turbine engine of claim 1, further comprising a cylinder having a movable piston connected to said movable source, said cylinder being in fluid communication with said outlet ends to receive compressed impeller exhaust to move said movable piston, thereby adjusting the position of the movable source based upon exhaust pressure of the rotating impeller.

4. The gas turbine engine of claim 1, further comprising a servomotor operatively connected with said movable source for moving said movable source.

5. A method of compressing gaseous fuel in a gas turbine engine comprising:
    a) rotating an impeller about an impeller axis of the gas turbine engine, wherein the impeller includes inlet and outlet portions at opposing ends of a plurality of vanes;
    b) injecting gaseous fuel from a movable source of gaseous fuel into said inlet portions such that the fuel travels along said vanes and through the respective outlet portions to a selected one of a plurality of diffuser channels spaced apart radially beyond said outlet portions; and
    c) adjusting the position of said movable source with respect to the impeller axis based upon the rotational speed of the impeller to ensure that the injected gaseous fuel enters said selected one of the diffuser channels as the rotational speed of the impeller is varied.

6. The method of claim 5, wherein said adjusting step comprises rotating the movable source about said impeller axis.

7. The method of claim 5, wherein said adjusting step comprises receiving pressurized air from the impeller in a cylinder having a piston connected to the movable source, thereby moving the movable source in response to exhaust pressure changes of the impeller.

8. The method of claim 5, wherein said injecting step comprises injecting natural gas.

* * * * *